Feb. 6, 1923.
W. R. SEIGLE
METHOD OF FORMING HEAT INSULATING SHEET MATERIAL
Filed Oct. 5, 1921
1,444,396
2 SHEETS-SHEET 1
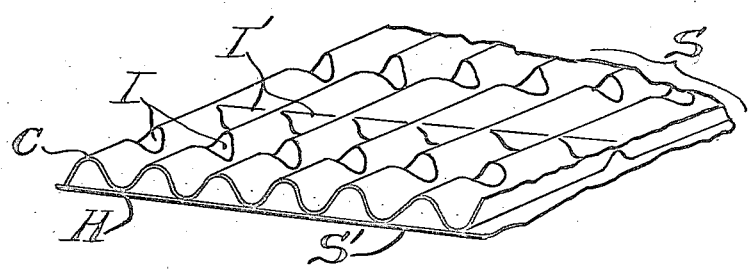
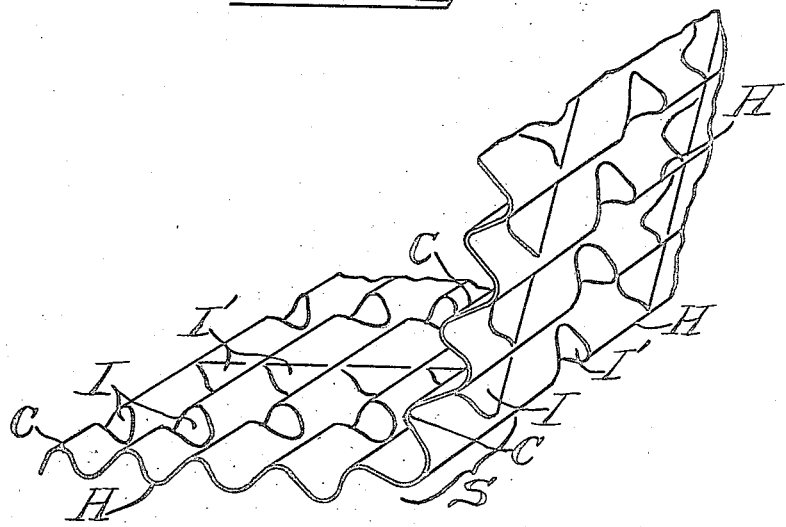
Inventor
William R. Seigle.
by his attys.

Feb. 6, 1923. 1,444,396
W. R. SEIGLE
METHOD OF FORMING HEAT INSULATING SHEET MATERIAL
Filed Oct. 5, 1921  2 SHEETS-SHEET 2
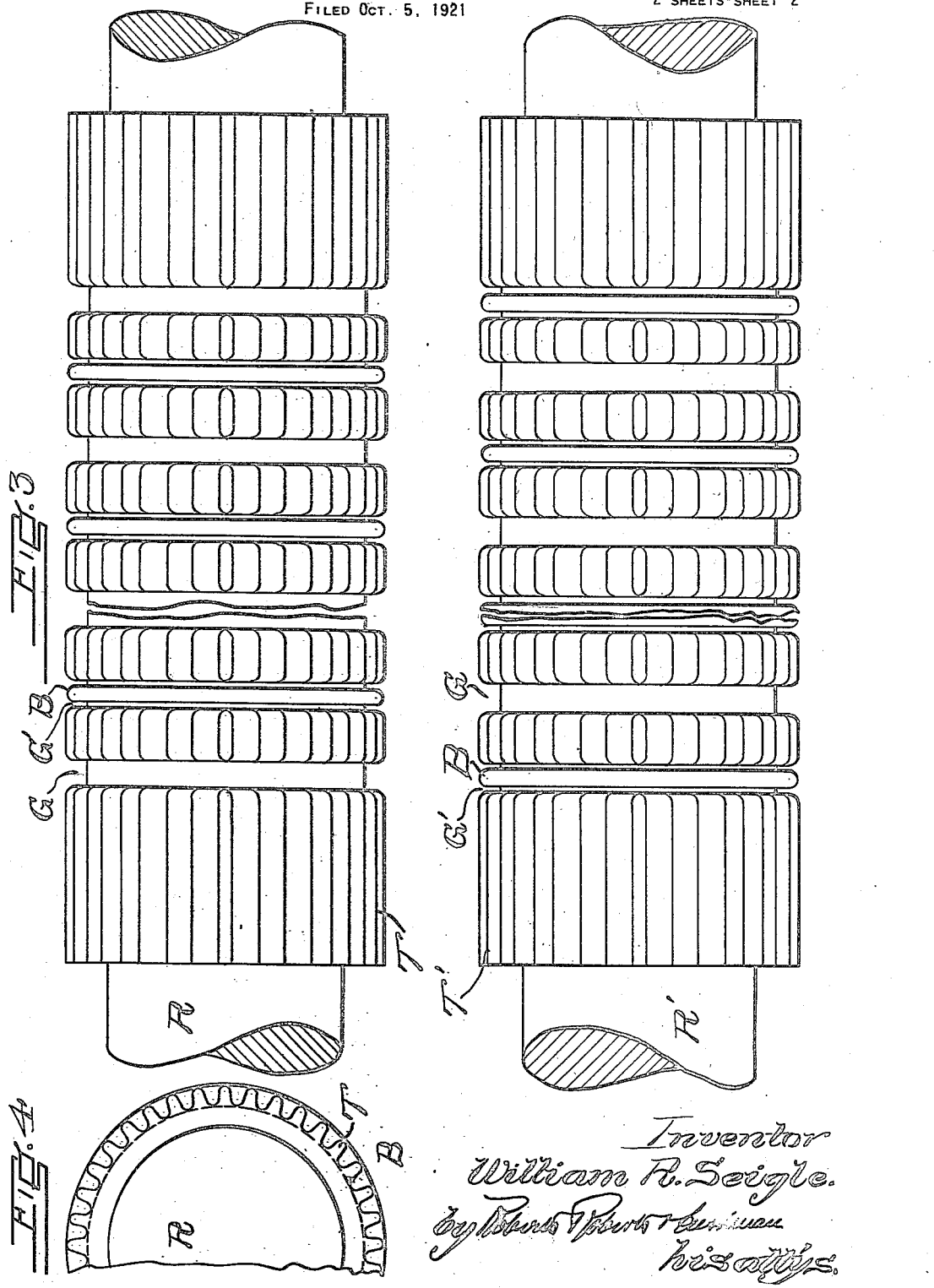

Patented Feb. 6, 1923.

1,444,396

UNITED STATES PATENT OFFICE.

WILLIAM R. SEIGLE, OF NEW YORK, N. Y.

METHOD OF FORMING HEAT-INSULATING SHEET MATERIAL.

Application filed October 5, 1921. Serial No. 505,533.

*To all whom it may concern:*

Be it known that I, WILLIAM R. SEIGLE, a citizen of the United States of America, and resident of New York city, in the county of New York and State of New York, have invented new and useful Improvements in Methods of Forming Heat-Insulating Sheet Material, of which the following is a specification.

My invention relates to the manufacture of heat-insulating materials, and consists of a method by which a sheet-member adapted to be incorporated in a heat-insulating structure, and comprising features which contribute cellular constitution to the completed structure, may be economically and expeditiously constructed out of plastic sheet material which, when finally set would be practically incapable of assuming under mechanical manipulation, the desired and characteristic structural features.

The ultimate object, to which this invention is contributory, is the fabrication of a cellular sheet comprising a corrugated and indented sheet of material having the characteristics of asbestos paper, and a covering sheet, preferably of similar material, the members of which are so constituted that the corrugations and indentations of one member produce, in conjunction with the other member, an assemblage of mutually isolated, air-containing cells.

In the drawings hereto annexed, which illustrate a product of my method, and mechanical instruments by which the method may be practiced,—

Figure 1 shows a composite cellular sheet of insulating material;

Figure 2, the corrugated and indented member of the sheet shown in Figure 1;

Figure 3, a pair of sheet-corrugating and indenting rolls, in side elevation, adapted to form the sheet-member shown in Figure 2; and Figure 4 is an end elevation of the said rolls.

As asbestos paper is the preferred material for fabricating the heat-insulating material by the herein described method, and presents characteristics with which the said method is peculiarly adapted to deal, this material will be herein referred to, as a type.

Insulating material has heretofore been made and used, consisting of a corrugated sheet of asbestos paper, adhesively secured to an uncorrugated covering sheet of the same material, as by sodium silicate. The air spaces formed by this assemblage of sheet members are long channels, between the corrugated surfaces of one member and the plain surface of the other, and the relatively great length of these channels permits more air circulation and consequent convective transfer of heat, than is desirable. To improve this condition, I have invented a new heat insulating material, exemplified in its elements by the structure shown in Fig. 1 in which the corrugations of a sheet of asbestos paper, or other suitable material, are indented from opposite sides, in alternate rows transverse to the corrugations, so that, when joined to covering sheets, these corrugated and indented sheets provide means for producing a large number of relatively small, mutually isolated, air cells. This heat insulating material is the subject matter of an application for United States Letters Patent, serially numbered 505,534, filed by me concurrently herewith.

The corrugated and indented sheet is illustrated in Figs. 1 and 2, and designated by the letter S. The oppositely presented crests of the corrugations, C and H, are transversely indented from opposite sides, as at I and I', these indentations being impressed into the corrugated material preferably so that the bottom of each indentation is flush with the crests of the corrugations on the side toward which the indentation is made. Thus, when covering sheets, as S' are secured to the corrugated and indented sheet S, the side-walls of the corrugations, the end walls produced by the indentations, and the surface of the covering sheet constitute enclosing walls, and produce a cellular construction in the entire sheet.

To serve their intended uses fully, such sheets must be susceptible of being bent or wrapped around curved-surface bodies, such as steam pipes. The bending cannot practically be effected except in surfaces of curvature transverse to the corrugations; the indentations, each being practically isolated, do not sensibly interfere with the bending of the sheet as a whole.

Material, like asbestos paper, which in its final condition is sufficiently rigid in constitution to retain a corrugated form, does not readily or practically yield to such treatment as indentation after the corrugated sheet is dried and set, or indeed, after the corrugations have been formed, unless the material be held and supported between corrugated matrices while the indentations are impressed into it.

By preference, I perform my method by simultaneously corrugating and transversely indenting a plastic sheet of asbestos paper, so that the instruments of corrugation contribute the support to the plastic material, necessary to confine the effect of indentation to the intended restricted region. A mechanical instrument by which my method can be effectively practised, is illustrated in Figs. 3 and 4, where R, R' are top and bottom rolls, corrugated, adapted to intermesh, with proper clearance for material, and impress the material with corrugations. These rolls are shown as separated one from the other; in practice they will intermesh. This mechanism forms the subject matter of an application for United States Letters Patent, serially numbered 505,532, filed by me concurrently herewith.

At predetermined intervals the faces of the rolls are circumferentially grooved, at G and G'. The grooves G of one roll register with grooves G' of the other; grooves G are cut with a plain cylindrical bottom, whereas grooves G' contain each an annular bead B, spaced from the sides of the groove. When the rolls are meshed, the tops of the beads B are spaced slightly from the bottoms of grooves G.

With the rolls R, R', in mesh, pass a sheet of wet asbestos paper between them, preferably taking the paper in the "green" state as it comes from the paper machine. The paper, in this plastic condition, is flexed into corrugations between the corrugating teeth T, T' of the rolls R, R', while each bead B presses down and indents the crowns of the corrugations, from one side or the other of the paper. As the beads B do this work, the corrugations are securely supported on each side of each groove G, so that the indentation of the corrugations does not disturb or distort the corrugations at either side. Furthermore, the simultaneous operation of the corrugating teeth and indenting beads, upon the plastic asbestos paper, is gradual, progressing from the initial engagement of the teeth and beads with the sheet, to the stage where the corrugating teeth of both rolls are in full mesh with each other. Thus, as the indenting action, and requirement of adjacent support, progresses, the support afforded by the corrugated surfaces of the rolls progresses likewise.

Preferably, and as herein shown, alternate grooves in each roll contain the beads B, so that the completed sheet has its corrugations indented in alternate rows, from opposite sides of the sheet. After being passed through the rolls, the sheet is allowed to set and harden, and is then ready to receive a covering sheet, such as S', on either or both sides. When as is Fig. 1, a single covering sheet is used, this serves to cover both sides of the corrugated sheet if the whole structure be wrapped spirally around a cylindrical object, such as a steam pipe.

A mode of operation which I have found effective is to take asbestos paper and heat or steam it if it be already moist or steam it, if dry, until it is moist. The paper thus rendered plastic and hot is then passed through rolls such as prescribed herein, the rolls being also heated as by steam in the well-known manner.

What I claim and desire to secure by Letters Patent is:

1. The method of producing intersecting sets of corrugations in plastic sheet material, which comprises passing a plastic sheet in one direction, progressively impressing a set of spaced corrugations in the direction of movement of the sheet, at the same time progressively impressing corrugations transverse to the movement of the sheet in the material in the spaces between the corrugations of the first named set, while providing clearance at either side of each corrugation of said first named set, to allow for rearrangement of the substance of the sheet where the two intersecting sets of corrugations adjoin.

2. The method of producing intersecting sets of corrugations in plastic sheet material, which comprises passing a plastic sheet in one direction, progressively impressing a set of spaced corrugations in the direction of movement to the sheet, and alternately from opposite sides of the sheet, at the same time progressively impressing corrugations transverse to the movement of the sheet in the material in the spaces between the corrugations of the first named set, while providing clearance at either side of each corrugation of said first named set, to allow for rearrangement of the substance of the sheet where the two intersecting sets of corrugations adjoin.

Signed by me at New York city, N. Y. this 23rd day of September 1921.

WILLIAM R. SEIGLE.

Certificate of Correction.

It is hereby certified that in Letters Patent No. 1,444,396, granted February 6, 1923, upon the application of William R. Seigle, of New York, N. Y., for an improvement in "Methods of Forming Heat-Insulating Sheet Material," errors appear in the printed specification requiring correction as follows: Page 2, line 67, for the word "is" read *in;* same page, line 102, claim 2, for the word "to" read *of;* and that the said Letters Patent should be read with these corrections therein that the same may conform to the record of the case in the Patent Office.

Signed and sealed this 20th day of March, A. D., 1923.

[SEAL.]
KARL FENNING,
*Acting Commissioner of Patents.*